United States Patent
Lepistö et al.

(10) Patent No.: US 12,495,131 B2
(45) Date of Patent: Dec. 9, 2025

(54) METHOD, AN APPARATUS AND A COMPUTER PROGRAM PRODUCT FOR STREAMING OF IMMERSIVE VIDEO

(71) Applicant: Nokia Technologies Oy, Espoo (FI)

(72) Inventors: Mikael Lepistö, Tampere (FI); Yu You, Tampere (FI); Sujeet Shyamsundar Mate, Tampere (FI); Saba Ahsan, Espoo (FI)

(73) Assignee: Nokia Technologies Oy, Espoo (FI)

( * ) Notice: Subject to any disclaimer, the term of this patent is extended or adjusted under 35 U.S.C. 154(b) by 95 days.

(21) Appl. No.: 18/342,392

(22) Filed: Jun. 27, 2023

(65) Prior Publication Data
US 2024/0007603 A1    Jan. 4, 2024

(30) Foreign Application Priority Data
Jul. 4, 2022  (FI) ..................... 20225623

(51) Int. Cl.
| | |
|---|---|
| *H04N 13/178* | (2018.01) |
| *H04N 13/167* | (2018.01) |
| *H04N 13/194* | (2018.01) |
| *H04N 19/17*  | (2014.01) |
| *H04N 19/46*  | (2014.01) |

(52) U.S. Cl.
CPC ......... *H04N 13/178* (2018.05); *H04N 13/167* (2018.05); *H04N 13/194* (2018.05); *H04N 19/17* (2014.11); *H04N 19/46* (2014.11)

(58) Field of Classification Search
CPC .... H04N 19/46; H04N 13/178; H04N 13/167; H04N 19/17
See application file for complete search history.

(56) References Cited

U.S. PATENT DOCUMENTS

| | | | |
|---|---|---|---|
| 2010/0162338 A1* | 6/2010 | Makhija | H04N 21/2402 725/114 |
| 2020/0037029 A1* | 1/2020 | He | H04L 65/612 |
| 2020/0092571 A1* | 3/2020 | Tourapis | G09G 5/14 |
| 2020/0322616 A1* | 10/2020 | Sakomizu | H04N 19/167 |
| 2021/0250568 A1* | 8/2021 | Huang | H04N 21/4728 |

(Continued)

FOREIGN PATENT DOCUMENTS

| | | |
|---|---|---|
| WO | 2022/013326 A1 | 1/2022 |
| WO | 2022/207962 A1 | 10/2022 |

OTHER PUBLICATIONS

"What is Motion-To-Photon Latency?", chioka.in, Retrieved on Jul. 25, 2023, Webpage available at : http://www.chioka.in/what-is-motion-to-photon-latency/.

(Continued)

*Primary Examiner* — Zhubing Ren
(74) *Attorney, Agent, or Firm* — McCarter & English, LLP

(57) ABSTRACT

The embodiments relate to a method and technical equipment for implementing the method. The method comprises receiving an omnidirectional video; determining a marker identifying a viewport for a client device; determining a region of the omnidirectional video frame based, at least partially, on the viewport; encoding the determined region with a marker for synchronized operation between the client device and a server; packetizing the encoded region; and transmitting the packetized region to the client device.

20 Claims, 8 Drawing Sheets

(56) References Cited

U.S. PATENT DOCUMENTS

2022/0021864 A1    1/2022    Mate et al.
2022/0116441 A1*    4/2022    Liu .......................... H04L 65/70

OTHER PUBLICATIONS

"Advanced Video Coding For Generic Audiovisual services", Series H: Audiovisual And Multimedia Systems, Infrastructure of audiovisual services—Coding of moving Video, Recommendation ITU-T H.264, Apr. 2017, 812 pages.
"High Efficiency Video Coding", Series H: Audiovisual And Multimedia Systems, Infrastructure of audiovisual services—Coding of moving video, Recommendation ITU-T H.265, Feb. 2018, 692 pages.
"3rd Generation Partnership Project; Technical Specification Group Services and System Aspects; IP Multimedia Subsystem (IMS); Multimedia Telephony; Media handling and interaction (Release 17)", 3GPP TS 26.114, V17.5.0, Jun. 2022, pp. 1-484.
"3rd Generation Partnership Project; Technical Specification Group Services and System Aspects; Telepresence using the IP Multimedia Subsystem (IMS); Media Handling and Interaction (Release 17)", 3GPP TS 26.223, V17.1.0, Jun. 2022, pp. 1-43.
"New Work Item on "Support of Immersive Teleconferencing and Telepresence for Remote Terminals"", 3GPP TSG SA Meeting #82, SP-180985, Agenda: 18, Huawei Technologies Co. Ltd, Dec. 12-14, 2018, 3 pages.
"ITT4RT Permanent Document—Requirements, Working Assumptions and Potential Solutions", 3GPP TSG-SA4 Meeting #109e, S4-200840, Agenda: 11.7, Version: 0.7.1, Intel, May 20-Jun. 3, 2020, 47 pages,.
Office action received for corresponding Finnish Patent Application No. 20225623, dated Jan. 26, 2023, 10 pages.
"ITT4RT Permanent Document—Requirements, Working Assumptions and Potential Solutions", 3GPP TSG SA WG4 Meeting #115-e, S4-211265, Agenda: 12.5, Version: 0.13.0, Nokia Corporation, Aug. 18-27, 2021, 10 pages.
Wang et al., "SphericRTC: A System for Content-Adaptive Real-Time 360-Degree Video Communication", Proceedings of the 28th ACM International Conference on MultimediaOct. 2020, 3 pages.

* cited by examiner

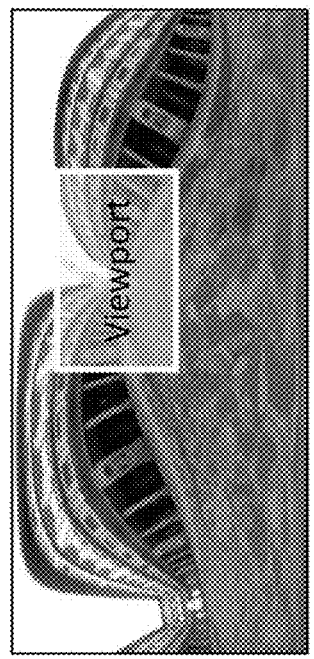
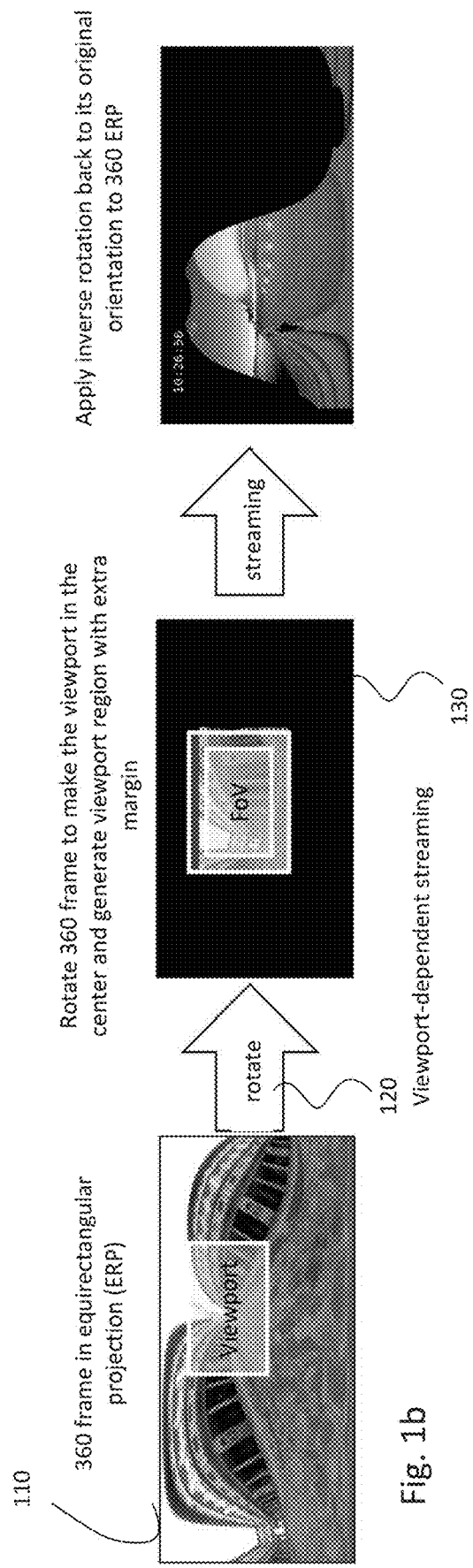

METHOD, AN APPARATUS AND A COMPUTER PROGRAM PRODUCT FOR STREAMING OF IMMERSIVE VIDEO

TECHNICAL FIELD

The present solution generally relates to streaming of 360 degree video.

BACKGROUND

Since the beginning of photography and cinematography, the most common type of image and video content has been captured by cameras with relatively narrow field of view and displayed as a rectangular scene on flat displays. The cameras are mainly directional, whereby they capture only a limited angular field of view (the field of view towards which they are directed).

More recently, new image and video capture devices are available. These devices are able to capture visual and audio content all around them, i.e., they can capture the whole angular field of view, sometimes referred to as 360 degrees field of view. More precisely, they can capture a spherical field of view (i.e., 360 degrees in all spatial directions). Furthermore, new types of output technologies have been invented and produced, such as head-mounted displays. These devices allow a person to see visual content all around him/her, giving a feeling of being "immersed" into the scene captured by the 360 degrees camera. The new capture and display paradigm, where the field of view is spherical, is commonly referred to as virtual reality (VR) and is believed to be the common way people will experience media content in the future.

SUMMARY

The scope of protection sought for various example embodiments of the invention is set out by the independent claims. The example embodiments and features, if any, described in this specification that do not fall under the scope of the independent claims are to be interpreted as examples useful for understanding various example embodiments of the invention.

Various aspects include a method, an apparatus and a non-transitory computer readable medium comprising a computer program, which are characterized by what is stated in the independent claims. Various details of the example embodiments are disclosed in the dependent claims and in the corresponding images and description.

According to a first aspect, there is provided an apparatus comprising at least means for receiving an omnidirectional video; means for determining a marker identifying a viewport for a client device; means for determining a region of the omnidirectional video frame based, at least partially, on the viewport; means for encoding the determined region with the marker for a synchronized operation between the client device and a server; means for packetizing the encoded region; and means for transmitting the packetized region to the client device.

According to a second aspect, there is provided a method comprising receiving an omnidirectional video; determining a marker identifying a viewport for a client device; determining a region of the omnidirectional video frame based, at least partially, on the viewport; encoding the determined region with the marker for synchronized operation between the client device and a server; packetizing the encoded region; and transmitting the packetized region to the client device.

According to a third aspect, there is provided an apparatus comprising at least one processor, memory including computer program code, the memory and the computer program code configured to, with the at least one processor, cause the apparatus to perform at least the following: receive an omnidirectional video; determine a marker identifying a viewport for a client device; determine a region of the omnidirectional video frame based, at least partially, on the viewport; encode the determined region with the marker for a synchronized operation between the client device and a server; packetize the encoded region; and transmit the packetized region to the client device.

According to a fourth aspect, there is provided a computer program product comprising computer program code configured to, when executed on at least one processor, cause an apparatus or a system to receive an omnidirectional video; determine a marker identifying a viewport for a client device; determine a region of the omnidirectional video frame based, at least partially, on the viewport; encode the determined region with the marker for a synchronized operation between the client device and a server; packetize the encoded region; and transmit the packetized region to the client device.

According to an embodiment, the marker has been specified by the client device and is one of the following: a color code; a watermark, a symbol, an identification.

According to an embodiment, the marker is associated with the operational metadata, used by the client device and the server.

According to an embodiment, the operational metadata is either the viewport definition and/or orientation data of the 360 degree video.

According to an embodiment, the orientation data comprises rendering parameters.

According to an embodiment, the color code is defined such that each byte is either 0x00 or 0xFF to make the color marker identifiable from encoding and decoding processes.

According to an embodiment a location of the marker is one or more corners in a viewport margin.

According to an embodiment, a type and/or the location of the marker that is used in the omnidirectional video is indicated in or along with a bitstream.

According to an embodiment, the marker identifies a viewing direction requested by the client device.

According to an embodiment, viewport margins are generated around a viewport, said viewport margins comprising the location of the marker.

According to an embodiment, the delivery mode and the location of a marker is determined from a request from the client device.

According to an embodiment, the computer program product is embodied on a non-transitory computer readable medium.

DESCRIPTION OF THE DRAWINGS

In the following, various embodiments will be described in more detail with reference to the appended drawings, in which FIG. 1a, b show examples of a viewport-dependent delivery (VDD) for 360 degree video content.

DESCRIPTION OF EXAMPLE EMBODIMENTS

Figure 2:
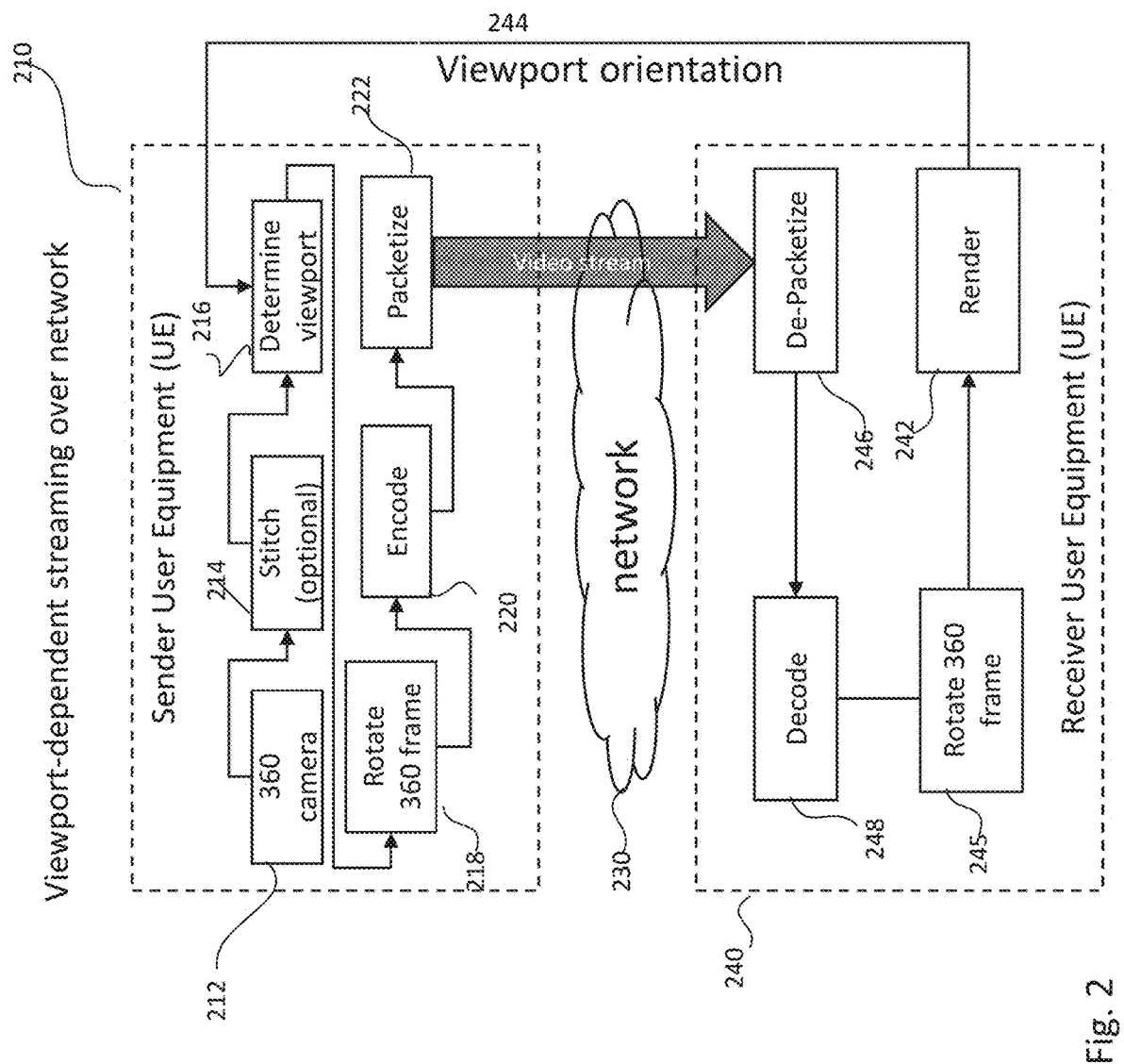
FIG. 2 shows another example a viewport-dependent delivery (VDD) for 360 degree video content.

In the following, several embodiments will be described in the context of video streaming. In particular, the present embodiments are targeted to frame metadata-independent, viewport-dependent, in particular, sphere-locked 360 video streaming.

The viewport-dependent technique relates to the delivery of only a part of the omnidirectional video (i.e., viewport) in high quality extracted from a re-projected or lively stitched picture or video source. while maintaining constant resolution of the picture (or video) to be encoded. It is to be noticed that in the present disclosure term "picture" refers to an image, a video frame, or a video This is achieved by first performing viewport selection based on the head orientation and viewport size (the viewport size may be the size of the Field of View (FoV) of the viewing device) to determine the relevant part of a projected picture (e.g., the equirectangular projection mode, i.e. ERP, is one of the common projection modes in 360 videos). Subsequently, re-orienting the selected viewport to the centre of the projected picture ensures consistent resolution of the selected viewport to be encoded and delivered to the viewers without sending any auxiliary data like corresponding viewport to be synced for rendering on the viewer side.

An encoded HQ viewport can be delivered so that it is locked to the centre of the user's viewport, or, in other words, locked with the user's viewing orientation. This is known as the viewport-locked content or mode.

The encoded HQ viewport can also be delivered as a sphere-locked HQ viewport. This requires metadata signalling of the re-orientation information to reverse the rotation at the sender to remap the delivered viewport to the original orientation, e.g., in the ERP mode. This can be implemented by 1) in-band technique, for example, applying the rotation codec SEI message in H264 or H265, or 2) out-of-band approach, for example, extending RTP header at the transport protocol level, if RTP payload for video format is used. In-band approach may require the support from a specific encoder and decoder, and hardly preserve the metadata with the frame to the rendering phase. The out-of-band approach may have the least capability to be synchronized timingly and accurately.

The following description and drawings are illustrative and are not to be construed as unnecessarily limiting. The specific details are provided for a thorough understanding of the disclosure. However, in certain instances, well-known or conventional details are not described in order to avoid obscuring the description. References to one or an embodiment in the present disclosure can be, but not necessarily are, reference to the same embodiment and such references mean at least one of the embodiments.

Reference in this specification to "one embodiment" or "an embodiment" means that a particular feature, structure, or characteristic described in connection with the embodiment in included in at least one embodiment of the disclosure.

Users may consume both videos and images as visual content. However, the consumption of videos and images have been independent on each other. The recent development of applications—such as immersive multimedia—has enabled new use cases where users consume both videos and images together. Immersive multimedia—such as omnidirectional content consumption—is more complex for the end user compared to the consumption of 2D content. This is due to the higher degree of freedom available to the end user (e.g., three degrees of freedom for yaw, pitch, and roll). This freedom also results in more uncertainty.

As used herein the term "omnidirectional" may refer to media content that has greater spatial extent than a field-of-view of a device rendering the content. Omnidirectional content may for example cover substantially 360 degrees in the horizontal dimension and substantially 180 degrees in the vertical dimension, but omnidirectional may also refer to content covering less than 360 degree view in the horizontal direction and/or 180 degree view in the vertical direction.

The present embodiments are related to scalable viewport dependent delivery (VDD) of immersive media with low latency or real-time delivery scenarios using RTP/RTCP (Real-time Transfer Protocol/RTP Control Protocol). This has relevance to a ITT4RT (Immersive Teleconferencing and Telepresence for Remote terminals) WI but more significantly related to implementation of this standard for scalable IoT (Internet of Things) applications. Relevant technical specifications are 3GPP TS 26.114: "IP Multimedia Subsystem (IMS); Multimedia telephony, Media handling and interaction" and 3GPP TS 26.223: "Telepresence using the IP Multimedia Subsystem (IMS); Media handling and interaction".

The MPEG Omnidirectional Media Format (OMAF) v1 standardized the omnidirectional streaming of single three-degrees of freedom (3DoF) content (where the viewer is located at the centre of a unit sphere and has three degrees of freedom (Yaw-Pitch-Roll). "Support of Immersive Teleconferencing and Telepresence for Remote Terminals" (ITT4RT) has been defined in 3GPP SP-180985. The objective of ITT4RT is to specify virtual reality (VR) support in MTSI (Multimedia Telephony Service for IMS) in 3GPP TS 26.114 and IMS-based (Internet Multimedia Subsystem) Telepresence in 3GPP TS 26.223 to enable support of an immersive experience for remote terminals joining teleconferencing and telepresence sessions. For MTSI, the work is expected to enable scenarios with two-way audio and one-way immersive video, e.g., a remote single user wearing an HMD (Head-Mounted Display) participates to a conference will send audio and optionally two-dimensional (2D) video (e.g., of a presentation, screen sharing and/or a capture of the user itself), but receives stereo or immersive voice/audio and immersive video captured by an omnidirectional camera in a conference room connected to a fixed network.

An important QoE (Quality of Experience) parameter for VDD is the motion to high-quality delay value or the motion-to-photon latency. Any delay in updating the high quality viewport area after head motion adversely impacts the user experience. While minimal motion to high quality delay is important for end user, to obtain overall efficient bandwidth utilization in the end to end system and cost effectiveness in provisioning of such a service is important for telecom infrastructure providers. This becomes more apparent when the geographical spread of content contributing node and consumption node across the world is considered. For example, omnidirectional capture sensors are used as IoT sensors in various industrial use cases. The IoT data consumers can be numerous and spread across the globe.

FIGS. 1a, 1b and FIG. 2 illustrate examples on a viewport-dependent delivery (VDD) for 360 degree video content.

FIG. 2 illustrates a sender UE 210 and a receiver UE 240 communicating over a network 230. It should be understood that while FIG. 2 illustrates steps taking place in the sender UE 210, some or all of the steps may occur in an MRF/MCU. A 360-degree camera 212 of or in communication with the sender UE 210 may capture an image from two or more sensors. The images captured with the two or more sensors may be stitched together at a stitching module 214, for example if the native camera API doesn't provide a stitched output to the sender UE 210. As a result, an omnidirectional video may be produced. This omnidirectional video may be of high quality.

Viewport selection 216 may be implemented in the sender UE 210 application based on the viewport size and viewport orientation 244 signaled by a rendering module 242 of the receiver UE 240 via the network. For example, the viewport selection may be based on the session description protocol (SDP) parameter for viewport signaled by the receiver UE 240 to the sender UE 210. This viewport orientation may be described as either field of view information or as a region in the projected picture (e.g., equirectangular projection (ERP)). If viewport orientation information is independent of projection format (e.g., ERP), it may be applied to different formats. Alternatively, if viewport orientation information is specific to the projection format, it may map exactly to the projected picture. Alternatively, the instantaneous value of viewport orientation information 244 may be obtained as feedback over real-time transport control protocol (RTCP), stream control transmission protocol (SCTP) or another protocol.

Based on the determined viewport 216, the sender UE 210 may rotate the omnidirectional video so that the determined viewport region is reoriented to the center of the projected picture of the omnidirectional video. This may ensure consistent resolution for the viewport-dependent encoded picture based on the projected picture. As shown in FIG. 1b a 360-degree ERP of the omnidirectional video 110 shows that, in this example, the viewport signaled by the receiver UE is not located at the center of the projected picture. Rotation 120 of the projected picture may result in a HQ viewport with field of view constraints that is rotated to the center of the ERP 130.

Turning back to FIG. 2, at 220, a high-quality portion of the omnidirectional video corresponding to the determined viewport may be encoded for transmission to the receiver UE. Encoding 220 may be performed by a single encoder with output always at the same resolution for a given viewport size, independent of the viewport orientation with respect to the omnidirectional content. At 222, the encoded portion may be packetized for transmission to the receiver UE 240. The packetized data may be transmitted to the receiver UE 240 in a video stream over the network 230. A rotation may additionally be transmitted with the video stream. A rotation may, for example, be represented by three rotation angles, each specifying the rotation around a coordinate axis of a three-dimensional coordinate system. Only a high-quality viewport may be delivered via the network 230, reflecting the user's viewing orientation, also referred to as viewport orientation. The user's viewport dependent video may be delivered as either viewport-locked delivery or sphere-locked delivery.

The delivered video stream may be depacketized 246 at receiver UE 240. The depacketized data may be decoded at 248. The decoded data may be rendered at 242. In the case of viewport-locked delivery mode, the sender UE 210 may deliver the HQ viewport, and the receiver UE may position the received content at the center of the viewport orientation for rendering 250. Consequently, the player/renderer of the receiver UE 240 might not perform any viewport change/update due to head motion during the rendering, as the received video is responsive to (i.e., updated according to) the viewport orientation 244 signaled to the sender UE 210, and subsequent update of the viewport content by the sender UE 210. Therefore, the latency perceived by a viewer of the content rendered with the receiver UE 240 for even small head motion may include at least one full round-trip time (RTT) period. This may require that frequent viewport orientation update(s) be signaled to the sender UE 210 as, for example, real-time transport control protocol (RTCP) feedback information. The feedback for responding to the head motion or change in viewport orientation, may be delivered over a network with an RTT value which is less than the frame rate in order to minimize perceived latency. This mode of delivery of omnidirectional video may also be used for optimized viewport sharing to "follower UEs," as described in ITT4RT Permanent Document v. 0.7.1, 84-200840, Jun. 3, 2020. For example, this mode of delivery of omnidirectional video may be useful for online gaming scenarios with centralized servers and ultra-low latency requirements.

The size of the viewport may be communicated at session start-up using session signaling, e.g., session description protocol (SDP) signaling. The viewport information feedback from the receiver UE 240 to the sender UE 210 may comprise the fields such as Viewport_Azimuth, Viewport_Elevation, Viewport_Tilt, Azimuth_Range and Elevation_Range, as defined in ITT4RT Permanent Document v. 0.7.1, 84-200840, Jun. 3, 2020. Alternatively, since the Azimuth_Range and Elevation_Range may correspond to the size of the viewport, they might not need to be signaled in every feedback report; a zoom factor may be signaled instead, which may serve to reduce the size of the feedback packet. The zoom_factor may define the level of magnification of the viewport content. For example, a zoom factor of 1.0 may indicate no zoom. Other suitable units may also be used.

There are several examples for performing viewport dependent delivery (VDD). Characteristics of several aspects are summarized in the following table:

| Aspect | Type of viewport dependent delivery | Viewport parameter interpretation | Content availability for head-motion | Signaling method indication in SDP |
| --- | --- | --- | --- | --- |
| 1 | HQ region only viewport-locked | Viewport parameter indicates the resolution of the delivered content viewport_size <= imageattr | Not required. | VDP-VL |

-continued

| Aspect | Type of viewport dependent delivery | Viewport parameter interpretation | Content availability for head-motion | Signaling method indication in SDP |
|---|---|---|---|---|
| 2 | HQ region only sphere-locked | Viewport parameter indicates the resolution of the delivered content Viewport size + margin = imageattr | Additional margins can be available and usable. In limiting case, the margins can cover entire captured field of view | VDP-SL |
| 3 | HQ viewport and LQ sphere | Viewport parameter indicates the high-quality region and the low-quality sphere The delivered content consists of viewport size + margin + LQ sphere = imageattr | Additional HQ margins can be available Full freedom due to LQ sphere. | VDP-SL and PPM with packed picture information |
| 4 | Tile extraction and merging | HQ tiles covering the viewport region (viewport size + margin) + LQ tiles covering the rest of the capture sphere Cfov = imageattr | Additional HQ margins can be available Full freedom due to low-quality or low-resolution tiles for other parts of sphere | VDP-SL, PPM = 1 or 2 |
| 5 | ROI encoded omnidirectional video frame | HQ region described by (viewport size + margins) encoded with higher quality Cfov = imageattr | Additional HQ margins can be available Full freedom due to low-quality encoded video in regions outside viewport orientation | VDP-SL |

In the above table term "Cfov" refers to "Captured field of view".

One of the known solutions for VDD method for omnidirectional conversational video, the viewport signals are delivered in the RTP header of the encoded AVC or HEVC frames, or via an out-of-band approach, e.g., application transport protocols of the receivers. The biggest problem of those approaches is to get a frame accurate timing. When the viewport is changed from the receiver, the sender (i.e., the server) generates the high-quality (HQ) region, based on the received viewport size and direction (e.g., field of view, with optional margins). The HQ region is then encoded and sent back to the viewer, together with the metadata about the viewport info. The HQ media and the metadata needs to arrive to the viewer at the exact same time.

WebRTC was conceived for conventional video telephony application with limited field of view video. On the other hand, delivering a sphere-locked VDD does require the (viewport orientation) direction data but WebRTC lacks an in-band technique to get the direction data and frames synced. The rendering won't work, and it generates jittering/jumpy/jerky effects due to the absence of exact frame render direction. The synchronization of timestamps is a common method but is requires buffering on both metadata and video frames on the client side and increases end-to-end latency. The metadata (direction) can be sent to the client using either an out-of-band or in-band approach. In-band works better than out-of-band approach towards the accurate synchronization. In-band approach is usually specific to certain transport payload format (e.g., using a RTP header extension).

The viewport dependent delivery, as known in the art, is not applicable in the case like browser-based viewers using WebRTC, even when WebRTC uses the same techniques such as SDP/RTP/RTCP. For example, the related art requires using the access to the RTP custom headers of the video frames, deep parsing for SEI rotation message or custom RTCP feedback packets for viewport orientation signals.

The present embodiments provide a generic approach to maintain a synchronized client session (e.g., viewport changes in 360 video) by encoding the timed session (e.g., client-side rendering instruction) in a form of the color code, or other visual indication, into the video after processing on the server-side. The session indicates the client-side rendering order with the rendering instruction that matches the video frame in a highly synchronized way. It can be preserved well with encoding process and independent to any codec. The present embodiments do not require any custom format support of any media transport payloads like RTP/RTCP. The synchronization mechanism is done and encoded into the media data.

In an embodiment of the present solution, the WebRTC session negotiation can include an additional parameter as an SDP attribute "in-band-vdd-metadata" parameter. The parameter can be used for session negotiation as well as signalling the location of the in-band metadata in the delivered video stream. Other SDP attributes such as margin position and extra margin size can be defined as well.

Figure 3:
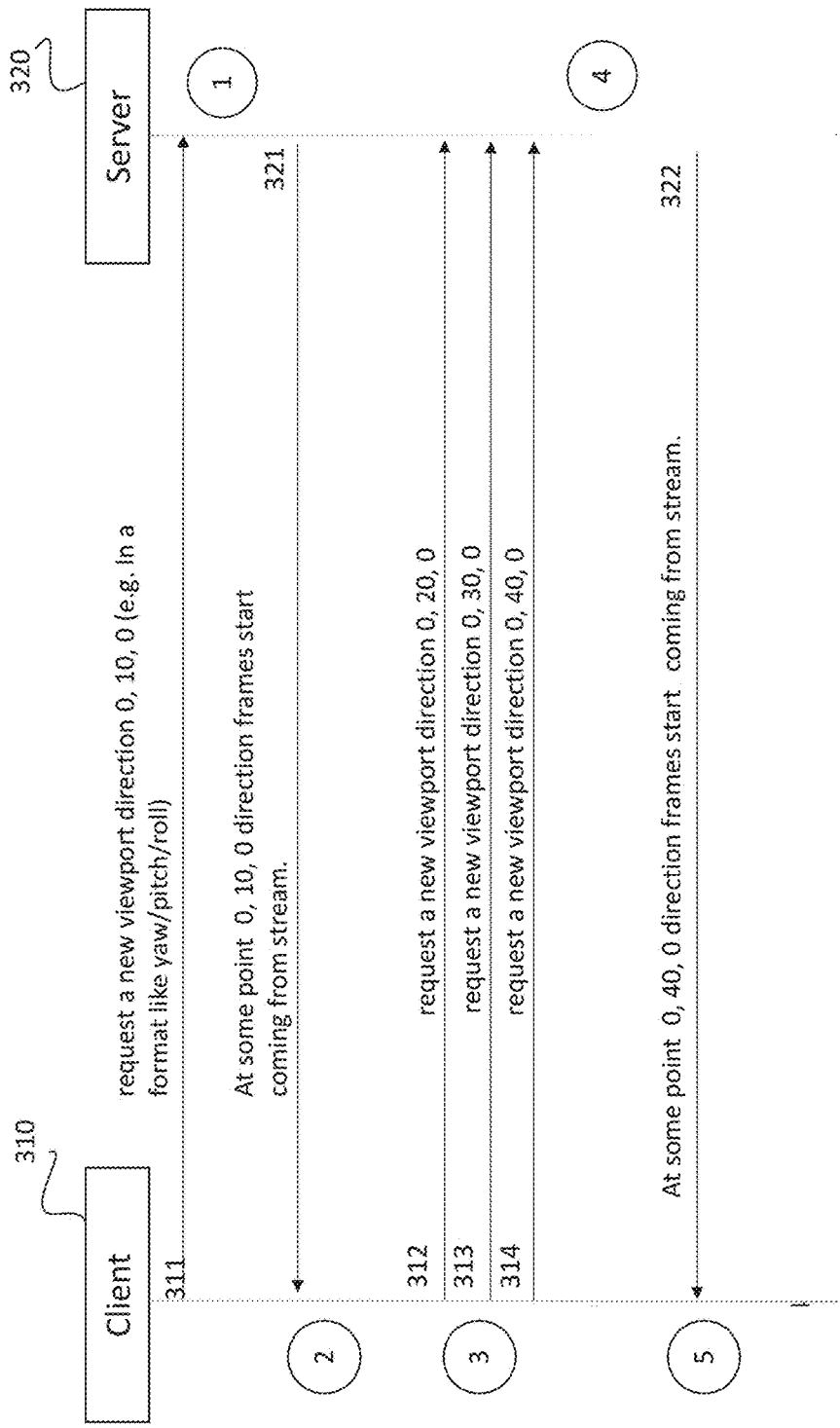
FIG. 3 shows an example of synchronizing rendered viewport direction of each frame using visual markers in the rendered frames.

FIG. 3 illustrates an example of a negotiation between a client 310 and server 320 and a problem that may occur. The client 310 requests 311 a new viewport direction 0, 10, 0 (e.g., in format like yaw, pitch, and roll, or azimuth, elevation, and tilt). The server 320 updates (1) the rendering direction of the stream to 0, 10, 0, whereupon the 0 10, 0 direction frames start streaming 321 to the client 310. The client 310 starts (2) immediately to draw an incoming stream to 0, 10, 0 direction, even though some of the frames that are coming in are still rendered on the server side for the previous viewport direction. The client 310 then sends (3) multiple update requests 312, 313, 314 to the server 320 really fast, e.g. a new viewport direction 0, 20, 0, new viewport direction 0, 30, 0 and new viewport direction 0, 40, 0. The server 320 updates (4) rendering direction of the stream first to 0, 20, 0, then to 0, 30, 0 and lastly to 0, 40, 0. Since update requests came in faster than the frames were generated, no frames generated for 0, 30, 0. The frames of direction 0, 40, 0 start coming 322 from the stream. The client 310 renders (5) the incoming stream to viewport direction 0, 40, 0 as per the latest viewport update request that was sent to the server. Thus, some of the previous frames rendered for 0, 10, 0 direction and 0, 20, 0 direction are drawn in client in 0, 40, 0 direction, which causes glitches in the visual experience of the viewer.

Resolving Viewport Direction for Each Frame Using an In-Band Approach

In the present embodiment, the client is configured to keep track of requested viewport direction changes. With the requested direction, the client sends the server a unique direction identifier (i.e., a "marker"), which shall be associated with the frames of the requested direction by the server. The client maintains a queue (for example a ring buffer) of the requested directions with the corresponding markers. The queue is serving as a lookup table to find out the correct metadata, i.e., viewport orientation data, i.e., rendering parameters. The orientation data may be defined as a rotation degree, for example azimuth, yaw, and pitch. The queue can be implemented using a ring buffer so some of the viewport data could be dropped when the viewport signal frequency is greater than the frame rate. For instance, the client sends the viewports in every 10 ms (roughly correspondent to 90 FPS), but the video is 30 FPS only.

Figure 4B:
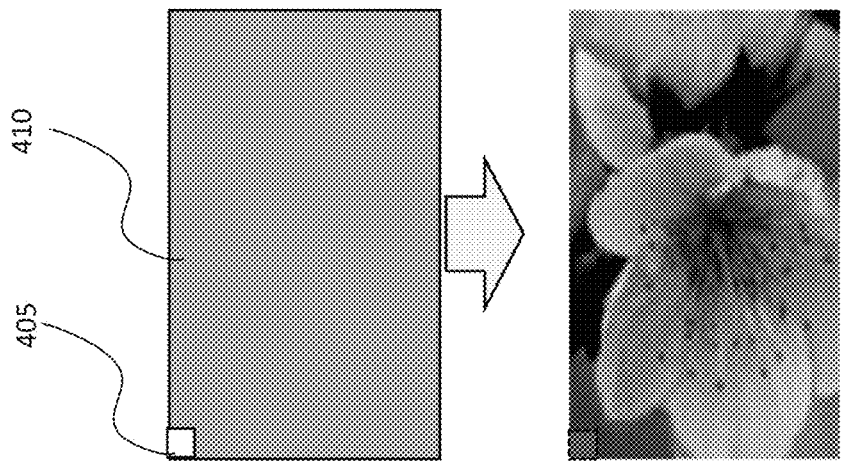
FIGS. 4a and 4b show examples of a 360 degree frame with viewport margins having a new marker.
Figure 4A:
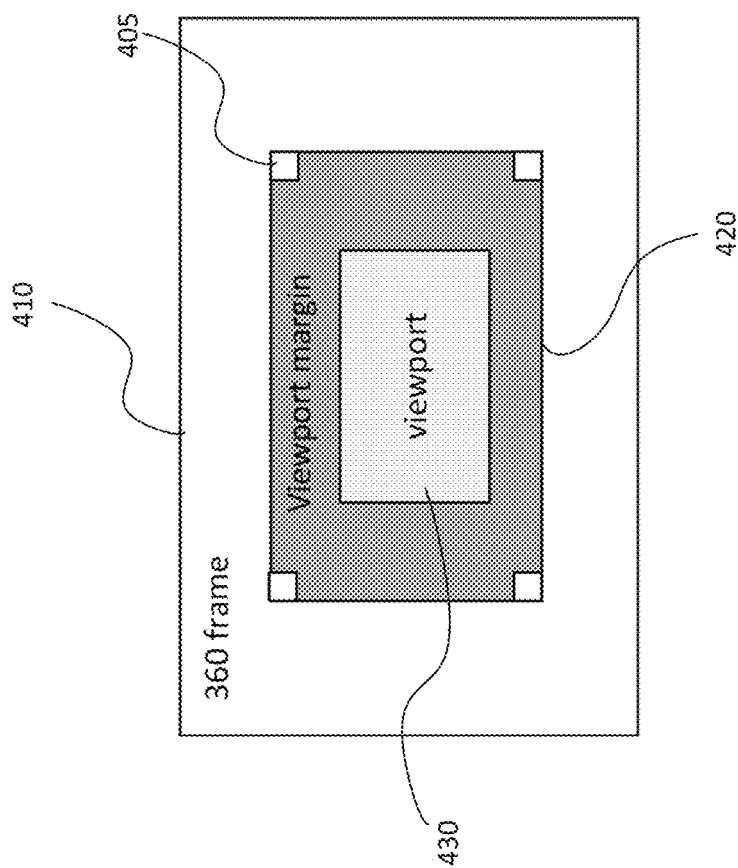

FIG. 4a illustrates a 360 frame 410 having a viewport 430 with viewport margins 420. If a new marker 405 is found from a frame, but exact match for the marker is not found from the lookup table, it can be assumed that the frame should be drawn to the latest direction, which was requested from the server. This approach of prioritizing the latest direction avoids head of line blocking, which can be a major problem in case of high-resolution or high bitrate videos with large number of packets per frame (depending on the video packetization mode). The situation should be avoided by selecting markers in a way that they can be interpreted reliably from incoming frames and preventing client to send new viewport requests so fast, which would cause overflow to ring buffer. The ring buffer size and the number of unique markers should be selected depending on the frame rate, expected end-to-end latency, and expected viewport change rate.

The process according to an embodiment proceeds as follows:
1. When a client requests a server to start sending a new viewing direction dirt, the client also sends a marker with the request. In this example, the marker is color red. It is appreciated that the marker can be any color, any sign, any symbol, a watermark, an identification or any other visual indication specified by the client device. Client may also write the requested direction to the lookup table containing the latest viewport update requests.
2. As soon as the server gets the request, it starts rendering frames with new dirt. The server also encodes the marker to the visual data of the frame. This may be implemented by drawing a region, e.g., a small box, to top-left corner of the frame (or any corner or any other location) called viewport marker location or anchor, wherein the area corresponds of the marker sent by the client. Alternatively, the marker can be written for example as an invisible noise over all the frame (like watermark) or to a place described by client or to a different place for each marker.
3. The client reads frames from the received media stream and for every frame, it checks the viewport anchor or the marker indicating the viewing direction (e.g., at the top-left corner by default of the delivered video frame) before rendering.
4. When the client notices that the frame marker has changed to color red (or other indication sent by the client), the client checks from the viewport update lookup table what was the direction, which was requested with the corresponding marker, and finds dir1.
5. Client now knows the correct direction how the current frame should be rendered for a sphere-locked mode. The direction data is needed for the client to do the correct rotation and render the frames correctly to the 360 sphere.

In FIG. 4a, viewport margins 420 are extra borders added to the user's viewport in order to build a spatial high-quality "safety area" around the user's viewport 430. One advantage of using margins is that, upon head motion, the Motion-To-High-Quality Delay (MTHQD) is greatly reduced.

As there can be extra margins (larger than the viewport region), for example in a sphere-locked mode, these regions outside the field-of-view of the viewers and would not be rendered. Particularly the edge/border of the margin is unlikely to be in the field-of-view when viewport updates are timely. Therefore, using the corners for viewport anchor has little impact on the user experience.

The viewport anchor can use those corners in viewport margin as a placeholder for markers. One corner is enough but one or more of the others can be used for more complex markers or error (redundancy check) purpose. The checking marker can be the same marker simply, or the next marker value in the direction/marker queue, e.g., current marker is 0x0000FF, then the verification marker in the next viewport anchor position (right-top corner) can be 0x00FF00, etc.

The viewport anchor are bits in the encoded frame that carry the required viewport information to the receiver. A sender or receiver may determine which bits in the frame are to be used as the viewport anchor during a session and signal them to the other party. The sender inserts the viewport anchor (which is a visual marker) to signal to the receiver the viewport orientation that is applicable to the delivered frame. Additional markers, e.g., for error checking can also be used. In this case, the viewport anchor would have multiple types of markers in the different positions (e.g., corners of the margins in this example).

In an example implementation, the four corners of the frame as shown in FIG. 4a can be used as viewport anchors. One corner is enough for sending the viewport anchor marker identifying the used viewport. One or more additional corners can be used for error checking and redundancy. For example, the top-left corner may be used for inserting the viewport anchor marker and the top-right corner may be used as the verification marker. The verification marker can be the same marker (for the sake of redundancy), or the next marker value in the direction/marker queue, e.g., if the viewport anchor marker is 0x0000FF, then the verification marker (right-top corner) can be 0x00FF00, etc.

The marker design may be based on the following criteria:
Limited number of markers results having limited size of lookup table on the player side. In case if marker recognition is done in WebGL shader, such a number of markers should be selected so that they are convenient to update to the shader on every frame.
The marker must be simple enough so that it can be recognized in a robust manner after encoder/decoder has processed it. For example, colors 0x000, 0x00f, 0x0f0 . . . can be interpreted safely even if the exact values of each color channel fluctuate depending on encoder bitrate and when decoded frame in HTML canvas has only 6bit depth per color channel.

The amount of data that needs to be encoded in a marker depends on number of markers used by the system. For example, 5 bits would allow to have 2^5=32 markers, An example of a marker implementation (the 8 queue key values with each byte is either 0x00 or 0xFF)) is given below:

0x000000,
0x0000FF,
0x00FF00,
0x00FFFF,
0xFF0000,
0xFF00FF,
0xFFFF00,
0xFFFFFF

The length of the queue is 8. It is appreciated that other color codes can be used to support other queue lengths.

In FIG. 4b the anchor 405 does "damage" on a small part of the frame 410. Even though the part is not visible immediately to the client (it is located in the viewport margin area), it can become visible when the client moves the current field of view (FoV) to the edge of the viewport margin. In this case, the rendering engine can apply some filtering techniques like anti-aliasing or edge expansion to paint the anchor with its neighbor colors. Given the small anchor size (e.g., 5×5 pixel), it is not visually visible to human eyes.

Implementation Use Case: WebRTC Video Stream Rendering Flow in Sphere-Locked Mode As mentioned earlier, WebRTC clients, especially browser-based clients, may find it difficult or in many instances cannot access any RTP metadata headers that may be used for carrying viewport orientation information for the currently rendered frame.

Being able to get viewport orientation for each frame through WebRTC on browser will enable possibility to write a good quality WebXR based VR client that could be accessed without installing any additional applications and just by going to the player website with Oculus Quest/Playstation or any other headset browsers without the dependencies on RTP payload extensions.

Figure 6:
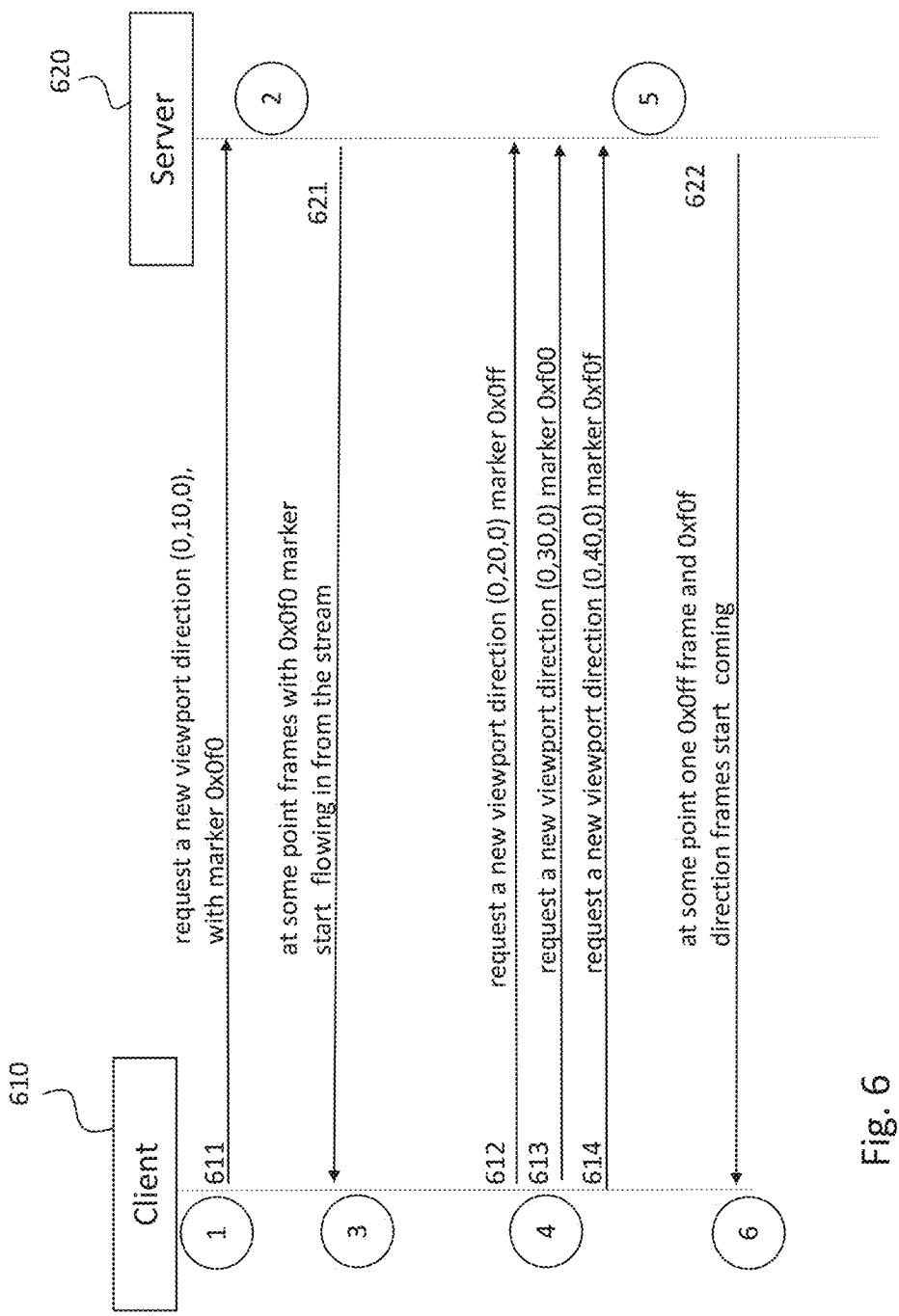
FIG. 6 shows an example of a negotiation between endpoints in a WebRTC.

FIG. 6 shows an example of a negotiation between the client 610 and the server 620 in the case of WebRTC (or any clients without the help of transport payloads).

The client 610 adds (1) to viewport update queue that has been requested, 0, 10, 0 direction with 0x0f0 marker. The client 610 then requests 611 a new viewport direction 0, 10, 0 (e.g., in format like yaw, pitch, and roll, or azimuth, elevation, and tilt) with a marker 0x0f0. The server 620 updates (2) the rendering direction of the stream to 0, 10, 0, and uses marker 0x0f0. The frames with 0x0f0 marker start 621 flowing in to the client 610 from the stream. When a frame comes in to the client 610 with marker 0x0f0, the client 610 updates (3) drawing direction to 0, 10, 0, and removes viewport update request from the queue. The client 610 then sends (4) multiple update requests 612, 613, 614 to the server 620 really fast. The client 610 updates (4) queue with markers 0x0ff (direction 0, 20, 0); 0xf00 (direction 0, 30, 0); 0xf0f (direction 0, 40, 0). The server 620 updates (5) rendering direction of the stream first to 0, 20, 0 with marker 0x0ff, then to 0, 30, 0 with marker 0x100, and lastly to 0, 40, 0 with marker 0xf0f. Since update requests came in faster than the frames were generated, no frames generated for direction 0, 30, 0 with marker 0xf00. The frames with marker 0x0ff and marker 0xf0f start coming 622 from the server 620. The client 610 draws (6) the incoming frames to the correct direction according to the marker directions stored in the update queue.

It is realized that the operation of FIG. 6 resembles the one shown with reference to FIG. 3. However, the example of FIG. 6 comprises also the following:

The client 610 keeps track which viewport directions it has requested from the server 620 and adds a marker for each update that server 620 should use to signal which frames were generated from that request. When frames with a known marker comes in, the client 610 will know from its own bookkeeping that which viewing direction was used to generate that frame.

Server 620 draws a square 5×5 pixel square (any other sizes can be agreed or negotiated at the beginning of the session) with given marker indication e.g., to the top-left corner of the frame Frame analyze operations are so simple that they can be implemented even with HTML canvas and CPU.

When frame is going to be rendered in JavaScript player, it is first copied from a video element to a temporary canvas buffer, then top-left pixels are copied from frame to another canvas, which is compared with the same area of the previous frame. If area average color has changed enough, then player decides that it did get viewport update in this frame and tries to resolve, which is the correct viewport direction for the updated marker indication.

Marker indications must be chosen in a way so that they can be recognized robustly also after they have been compressed/uncompressed by the server and player pipelines.

Because currently there are 3 bit markers, 8 different marker colors (0x000, 0x00f, 0x0f0, 0x0ff, 0xf00, 0xf0f, 0xff0, 0xfff) can be used. That also limits marker queue size to 8 updates to always have unambiguous direction for each marker color or other indication. In development environment this has worked well.

To prevent queue overflow JavaScript player does not send viewport update to the server unless viewing direction has changed at least few degrees.

Current implementation is using predetermined color sequence which is shared knowledge between client and the server. So, the client does not send the actual marker color to the server, but both sides just know which marker color should be used for the next viewport update. This requires client to synchronize its sequence position with the server, before sending any viewport updates. Syncing is done by monitoring current frame marker color and if multiple subsequent frames are having the same marker and viewport update queue is empty then client knows the correct position in the marker color cycle.

Current system relies on a fact that exactly one viewport update call is called for each update command to keep client and server sequences in sync.

The reason why marker updates are in a queue or a linked-list, instead of a plain lookup table/map is to handle the case where marker (the key of a map) is not found. In that case the queue is emptied, and the last update direction is applied. Resyncing client to server will happen automatically next time when markers start being recognized again.

In FIG. 6, when a new marker is recognized from the stream with the value 0x0ff, for instance, (interpreted from pixel data) the drawing direction for that frame is resolved, for example, the value (0,20,0). Then for the next frame another marker update 0xf0f is recognized. Since there is 0xf00 in queue before the current frame it will be discarded and next update with correct marker 0xf0f is found and drawing direction is updated to (0,40,0).

Additional Implementation Options:

Current WebRTC-based implementation reads every frame data first from a Html <video/> element to html 2d <canvas/> element; and then reads raw pixels of the marker from the canvas. Those operations take easily over 10 ms due to data transfer between CPU and GPU. The view direction resolving could be done completely in the WebGL shader to avoid any extra GPU/CPU copying, the complete lookup table containing markers colors and corresponding viewport directions can be passed to the shader as float array. Fixing the frame from the marker block: It is not absolutely required as the marker region is outside the active FoV typically. Visually it is so small that it is barely noticeable for the viewer when image resolution is over 1024×1024. If needed, any image inpainting techniques could be used to fix the block if needed. For example, With the help of WebGL/OpenGL shader the marker area could be substituted with data from surrounding pixels thus preventing flickering color to annoy user if marker happens to become visible (the FoV is fast moved to the margin where the color marker is) area at some fast movement point.

- Viewport update requests could be throttled, for example, to send at most 1 request per 10 ms.
- In another embodiment, Alpha channels can also be used for providing the marker information to raw video frames (e.g., in a raw video format like packed YUVA 4:2:2 U:Y:A:V:Y:A), encode, and package into a format that supports alpha-channel such as WebM.
- In another embodiment, the ring buffer size for storing marker-orientation information at the client may be dynamically adjusted, depending on the frame rate and other requirements or network congestion situation. Generally speaking, the buffer size could be larger to hold more identifiers when the network situation is good (less packet lose, and congestion is low). The larger the buffer size, the more likely the in-band approach would work better to handle the out-of-order packets in the networked environment.
- As shown in FIG. 3, it is possible for a sender to skip over some orientation feedback sent by the client. This may be because the updates came in same packet (e.g., if TCP is used) as shown in the FIG. 3 or if the feedback arrives close together or out of order. In this case, it is possible for the client and server to fall out of synch, especially if the ring buffer is short or if the number of markers is limited. In an embodiment implementation, the ring buffer and marker design (e.g., number of unique markers to be used) may be dynamically changed depending on the performance. The performance may be based on end-to-end latency and viewport orientation changes. It may be detected by number of markers in the ring buffer that are missing in the updated framed, i.e., no updates were made by sender based on that marker. It may also be detected by the presence of an unknown marker in a frame from the sender, one that is not in the ring buffer. The reason for dynamically changing the marker design and ring buffer may be to reduce the compute and storage complexity when conditions are ideal.

Figure 5A:
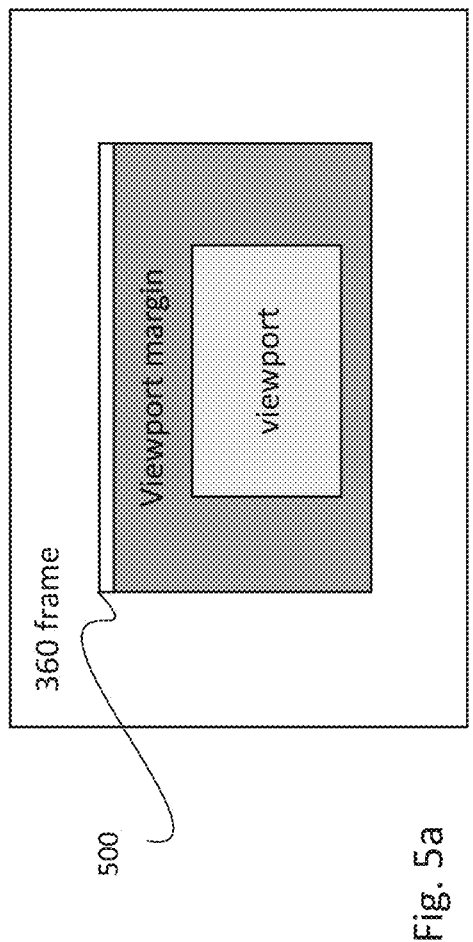
FIGS. 5a and 5b similar to FIGS. 4a and 4b, show another example of a 360 frame with metadata margins.
Figure 5B:
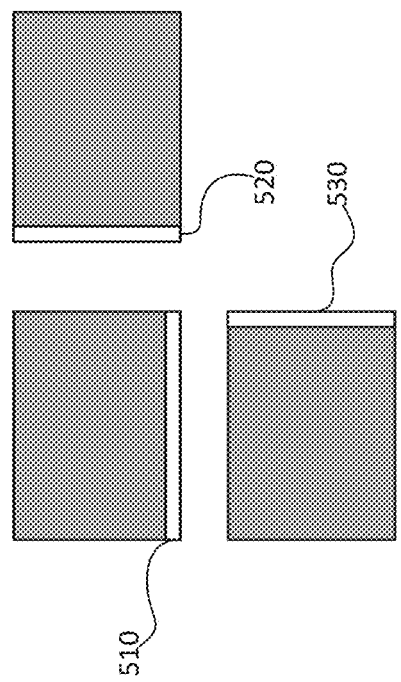

An Alternative Approach to Encode the Actual View Direction Yaw/Pitch/Roll Data to Viewport Anchor FIG. 5a, b illustrates an alternative approach to encode the actual view direction yaw/pitch/roll data. Instead of having a marker and lookup table identifying which data should be connected to each frame, the actual direction data could be encoded by the server to the pixel data of the frame, but this requires more bits to be encoded. As illustrated in FIG. 5a, one way to have more space to encode additional data to each frame without writing it to one corner of the frame would be to have an additional "metadata margin" 500, which could be interpreted and then sliced completely out from the frame before rendering it to the screen. FIG. 5b illustrates a frame with metadata margins 510, 520, 530 in other places than in FIG. 5a. The orientation of the metadata margin can contain values for yaw, pitch, and roll. Also, the orientation can be represented by a RGB color. The size and position of the metadata margin can be signaled in the session negotiation phase. The attribute "a=in-band-vdd-metadata" may be extended to include position of metadata margin. Additional values can be defined for the parameter 'position' as defined below.

In the case of sending encoded yaw/pitch/roll data, there is a need to figure out the amount of data required to encode a single color for the number of markers to achieve sufficient granularity in the viewing direction.

Benefit of having the yaw/pitch/roll encoded data delivered in the pixels is that client would not need to keep track of viewport update requests, but drawbacks would be having to use bigger/multiple markers for encoding the same amount of data (3 bits can be used, for example, to resolve 3× 32 bit float values). Implementation for this would be simpler compared to lookup table since this would not require bookkeeping/passing marker to the server with viewport updates. This is also similar to the rotation SEI message, but SEI messages are handled by the decoder and some decoder implementations do not make SEI contents available to renderer. This approach gives more control to the application developer. Furthermore, this approach is independent of the underlying codec.

In case of an SDP session description, an attribute "in-band-vdd-metadata" could be included to indicate the support for such metadata by the offerer, if the answerer retains the attribute in answer, this method can be used. In an implementation embodiment, the "in-band-vdd-metadata" includes additional argument "a=in-band-vdd-metadata: <position>". In this case, position value can be as one or more of the following:

| Position value | Semantics |
| --- | --- |
| 0 | Reserved |
| 1 | Top left |
| 2 | Top left with redundant copy parameter Top right for verification |
| 3 | Top left with check parameter next direction Top right for verification |
| 4 | Top edge of the frame |
| 5 | Bottom edge of the frame |
| 6 | Left edge of the frame |
| 7 | Right edge of the frame |
| 8-10 | Reserved |

According to another embodiment, the SDP parameter may include an indication of the choice of marker that will be used. This may be in addition to the position or without it. The attribute in this case is "a=in-band-vdd-metadata:

<position>,<marker>". Both position and marker can be optional parameters. The marker may include one or more of the following:

| Marker fields | Semantics |
| --- | --- |
| Length of marker | Number of bits needed for the marker. This determines the length of the marker field that is sent by the client to the server when requesting a new viewport orientation. |
| Model | This indicates the design of the marker, e.g., the 8 queue key values shown as an example above. The syntax of this field may vary. It may be a URI that points to a location that provides the design model in a standard format, or a list of the values to be used, or a code that has a predefined value assigned to it (e.g. a 4 bit field, such that a particular marker design corresponds to the different values assigned to that 4 bit field that is known to both client and server, either as part of the implementation or a standard). |
| Length of Queue | The length of the marker queue. |

According to an embodiment, the attribute "in-band-vdd-metadata" may contain a list of position and marker values in an offer indicating all values supported by the offerer. The first of these values may be the preferred choice of the offerer. The answerer can then include only its preferred one from the list in the answer. For example, the syntax of the attribute may be extended as: "a=in-band-vdd-metadata: <position>, <marker>[; <position>, <marker>]."

Figure 7:
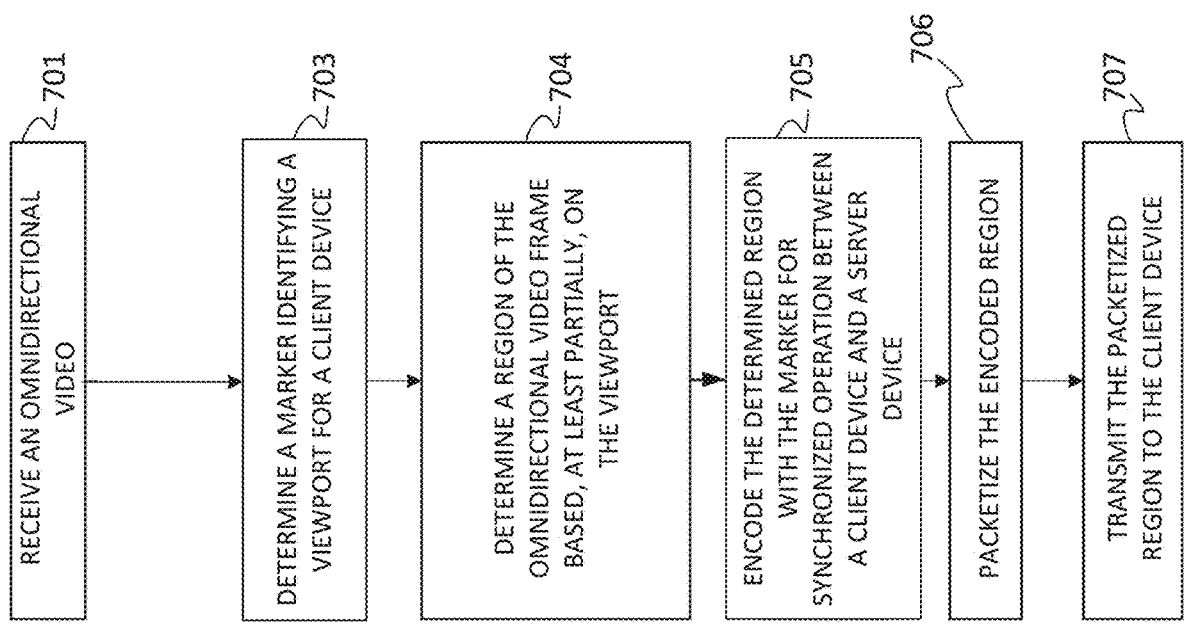
FIG. 7 shows an example of a method according to an embodiment.

FIG. 7 illustrates an example of a method occurring at a server. The method comprises
  receiving 701 an omnidirectional video;
  determining 703 a marker identifying a viewport for a client device;
  determining 704 a region of the omnidirectional video frame based, at least partially, on the viewport;
  encoding 705 the determined region with the marker for a synchronized operation between the client device and a server;
  packetizing 706 the encoded region; and
  transmitting 707 the packetized region to the client device.

Each of the steps can be implemented by a respective module of a computer system.

The general idea of the solution is to send a set of rendering parameters and a marker from a client to a server, whereupon the server embeds/encodes the marker to the visual frame so that the client is able to tell which parameters were used to render the image. The marker can be any visual indication being encoded to the visual data of the frame. Instead of the marker being sent from the client to the server, the server may encode information on the direction of the viewport directly to the visual data of the frame.

Thus, according to an example embodiment, the apparatus may comprise one or more computer means for receiving an omnidirectional video; means for determining a marker identifying a viewport for a client device; means for determining a region of the omnidirectional video frame based, at least partially, on the viewport; means for encoding the determined region with the marker for a synchronized operation between the client device and a server; means for packetizing the encoded region; and means for transmitting the packetized region to the client device. The means comprises at least one processor, and a memory including a computer program code, wherein the processor may further comprise processor circuitry. The memory and the computer program code are configured to, with the at least one processor, cause the apparatus to perform the method of FIG. 7 according to various embodiments.

Figure 8:
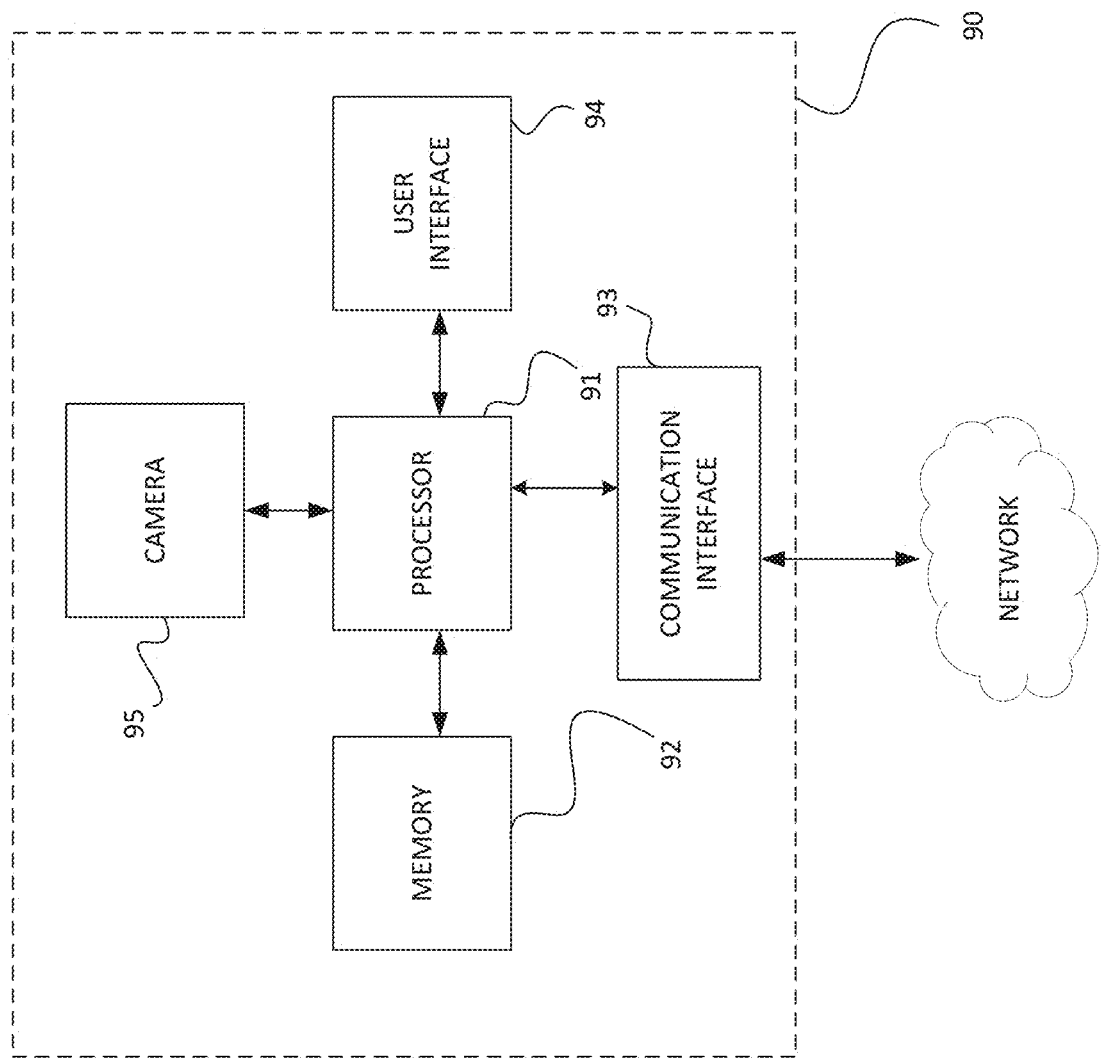
FIG. 8 shows an example of an apparatus.

An apparatus according to an embodiment is illustrated in FIG. 8. The apparatus is a user equipment (also referred to as "a client device") for the purposes of the present embodiments, i.e., for content authoring. The apparatus 90 comprises a main processing unit 91, a memory 92, a user interface 94, a communication interface 93. The apparatus according to an embodiment, shown in FIG. 8, also comprises a camera module 95. Alternatively, the apparatus may be configured to receive image and/or video data from an external camera device over a communication network. The memory 92 stores data including computer program code in the apparatus 90. The computer program code is configured to implement the method according to various embodiments by means of various computer modules. The camera module 95 or the communication interface 93 receives data, in the form of images or video stream, to be processed by the processor 91. The communication interface 93 forwards processed data, i.e., the image file, for example to a display of another device, such a virtual reality headset. When the apparatus 90 is a video source comprising the camera module 95, user inputs may be received from the user interface.

The various embodiments can be implemented with the help of computer program code that resides in a memory and causes the relevant apparatuses to carry out the method. For example, a device may comprise circuitry and electronics for handling, receiving, and transmitting data, computer program code in a memory, and a processor that, when running the computer program code, causes the device to carry out the features of an embodiment. Yet further, a network device like a server may comprise circuitry and electronics for handling, receiving, and transmitting data, computer program code in a memory, and a processor that, when running the computer program code, causes the network device to carry out the features of an embodiment.

A computer program product according to an embodiment can be embodied on a non-transitory computer readable medium. According to another embodiment, the computer program product can be downloaded over a network in a data packet.

If desired, the different functions discussed herein may be performed in a different order and/or concurrently with other. Furthermore, if desired, one or more of the above-described functions and embodiments may be optional or may be combined.

Although various aspects of the embodiments are set out in the independent claims, other aspects comprise other combinations of features from the described embodiments and/or the dependent claims with the features of the independent claims, and not solely the combinations explicitly set out in the claims.

It is also noted herein that while the above describes example embodiments, these descriptions should not be viewed in a limiting sense. Rather, there are several variations and modifications, which may be made without departing from the scope of the present disclosure as, defined in the appended claims.

The invention claimed is:
1. An apparatus comprising:
   at least one processor; and
   at least one memory storing instructions that, when executed with the at least one processor, cause the apparatus at least to:

receive an omnidirectional video;
determine a marker identifying a request for a viewport for a client device;
determine a region of a frame of the omnidirectional video based, at least partially, on the viewport;
encode the determined region, along with the marker, for a synchronized operation between the client device and a server;
packetize the encoded region; and
transmit the packetized region to the client device.

2. The apparatus according to claim 1, wherein the marker has been specified by the client device and is one of the following: a color code, a watermark, a symbol, or an identification.

3. The apparatus according to claim 2, wherein the marker comprises a color code that is defined such that each byte is either 0x00 or 0xFF to make the marker identifiable from encoding and decoding processes.

4. The apparatus according to claim 1, wherein the marker is associated with an operational metadata, used by the client device and the server.

5. The apparatus according to claim 4, wherein the operational metadata comprises a viewport definition and/or orientation data of the omnidirectional video.

6. The apparatus according to claim 5, wherein the orientation data comprises rendering parameters.

7. The apparatus according to claim 1, wherein a location of the marker is one or more corners in the determined region.

8. The apparatus according to claim 7, wherein the at least one memory stores instructions that, when executed with the at least one processor, cause the apparatus to:
indicate in or along with a bitstream a type and/or the location of the marker that is used in the frame of the omnidirectional video.

9. The apparatus according to claim 1, wherein the at least one memory stores instructions that, when executed with the at least one processor, cause the apparatus to:
generate a parameter to be transmitted in or along a bitstream, the parameter indicating at least a location of the marker.

10. The apparatus according to claim 1, wherein the marker identifies a viewing direction requested by the client device.

11. The apparatus according to claim 1, wherein the at least one memory stores instructions that, when executed with the at least one processor, cause the apparatus to:
generate viewport margins around the viewport, the viewport margins comprising a location of the marker.

12. The apparatus according to claim 1, wherein the at least one memory stores instructions that, when executed with the at least one processor, cause the apparatus to:
determine a delivery mode and the marker from the request from the client device.

13. A method, comprising:
receiving an omnidirectional video;
determining a marker identifying a request for a viewport for a client device;
determining a region of a frame of the omnidirectional video based, at least partially, on the viewport;
encoding the determined region, along with the marker, for a synchronized operation between the client device and a server;
packetizing the encoded region; and
transmitting the packetized region to the client device.

14. The method according to claim 13, wherein the marker has been specified by the client device and is one of the following: a color code, a watermark, a symbol, or an identification.

15. The method according to claim 14, wherein the marker comprises a color code that is defined such that each byte is either 0x00 or 0xFF to make the marker identifiable from encoding and decoding processes.

16. The method according to claim 13, wherein the marker is associated with an operational metadata, used by the client device and the server.

17. The method according to claim 16, wherein the operational metadata comprises a viewport definition and/or orientation data of the omnidirectional video.

18. The method according to claim 17, wherein the orientation data comprises rendering parameters.

19. The method according to claim 13, wherein a location of the marker is one or more corners in the determined region.

20. The method according to claim 19, further comprising:
indicating in or along with a bitstream a type and/or the location of the marker that is used in the frame of the omnidirectional video.

* * * * *